United States Patent
Zhang

(10) Patent No.: US 10,393,031 B2
(45) Date of Patent: Aug. 27, 2019

(54) METHODS AND SYSTEM FOR A THROTTLE

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 255 days.

(21) Appl. No.: 15/632,948

(22) Filed: Jun. 26, 2017

(65) Prior Publication Data
US 2018/0372007 A1    Dec. 27, 2018

(51) Int. Cl.
*F02D 9/10* (2006.01)
*F02M 35/10* (2006.01)
*F02D 9/16* (2006.01)
*F02D 9/02* (2006.01)
*F02D 29/02* (2006.01)

(52) U.S. Cl.
CPC ......... *F02D 9/1015* (2013.01); *F02D 9/1035* (2013.01); *F02D 9/1055* (2013.01); *F02D 9/16* (2013.01); *F02M 35/10229* (2013.01); *F02M 35/10255* (2013.01); *F02D 29/02* (2013.01); *F02D 2009/024* (2013.01)

(58) Field of Classification Search
CPC ........ F02D 9/10; F02D 9/1015; F02D 9/1035; F02D 9/1055; F02D 9/16; F02D 29/02; F02D 2009/024; F02M 35/10229; F02M 35/10255
See application file for complete search history.

(56) References Cited

U.S. PATENT DOCUMENTS

| 6,199,824 | B1 | 3/2001 | Lee |
| 8,261,716 | B2 | 9/2012 | Bergbauer et al. |
| 9,651,004 | B2 * | 5/2017 | Zhang ............... F02M 35/10229 |
| 9,964,080 | B2 * | 5/2018 | Zhang .................. F02D 9/1005 |
| 2015/0285160 | A1 | 10/2015 | Zhang |
| 2017/0138276 | A1 | 5/2017 | Zhang |
| 2017/0138277 | A1 | 5/2017 | Zhang |

FOREIGN PATENT DOCUMENTS

CN    202484356 U    10/2012

OTHER PUBLICATIONS

Zhang, X., "Mixer for Mixing Exhaust Gas," U.S. Appl. No. 15/058,743, filed Mar. 2, 2016, 48 pages.
Zhang, X. et al., "Method and System for Vacuum Generation in an Intake," U.S. Appl. No. 15/081,151, filed Mar. 25, 2016, 61 pages.
Zhang, X., "Method and System for Vacuum Generation Using a Throttle," U.S. Appl. No. 15/247,492, filed Aug. 25, 2016, 42 pages.

* cited by examiner

*Primary Examiner* — Hieu T Vo
(74) *Attorney, Agent, or Firm* — Julia Voutyras; McCoy Russell LLP

(57) ABSTRACT

Methods and systems are provided for a vacuum generating throttle. In one example, a method may include pivoting the throttle based on a desired airflow rate and/or vacuum replenishment, where the airflow rate and/or vacuum replenishment are adjusted based on one or more passages arranged interior to the throttle.

20 Claims, 10 Drawing Sheets

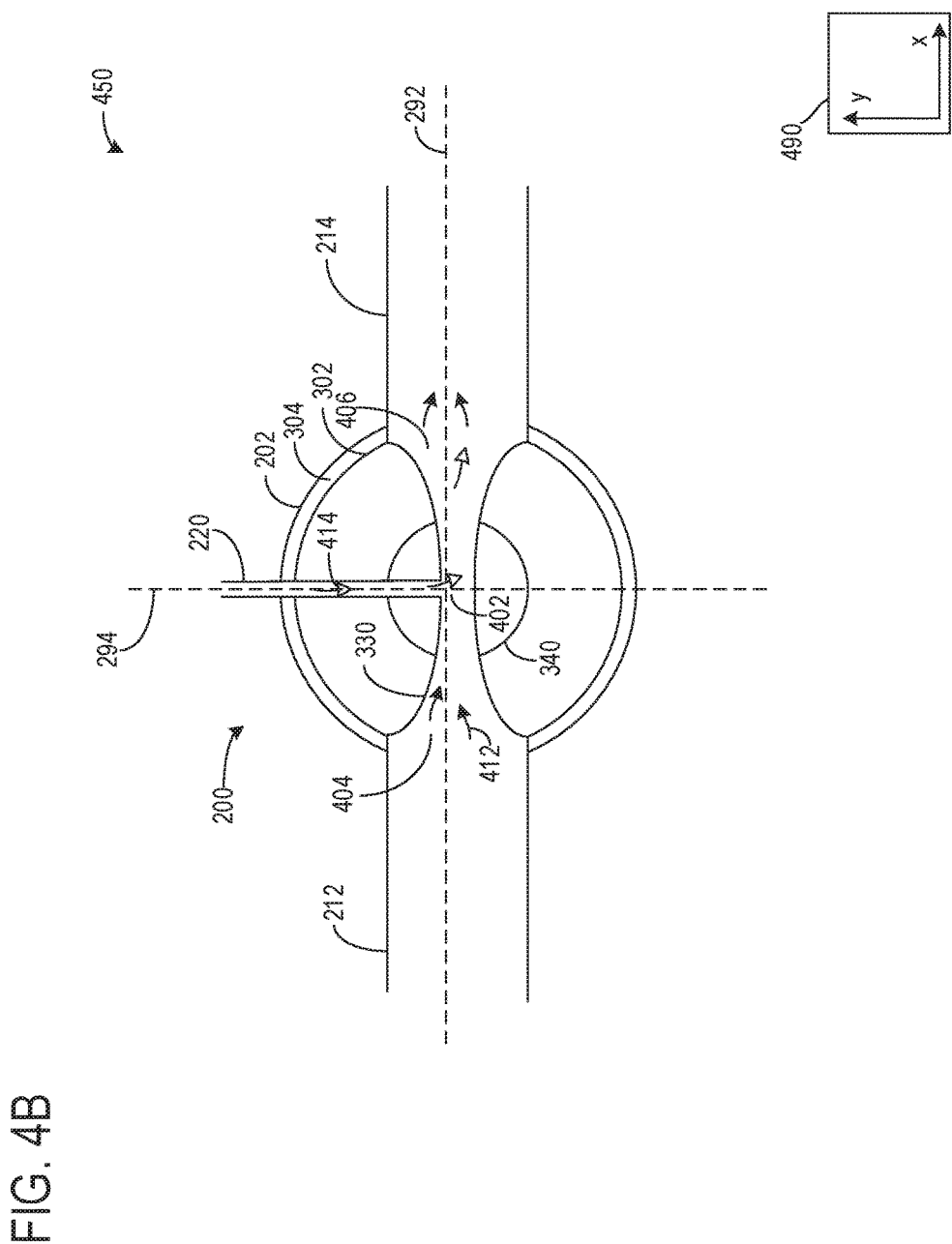

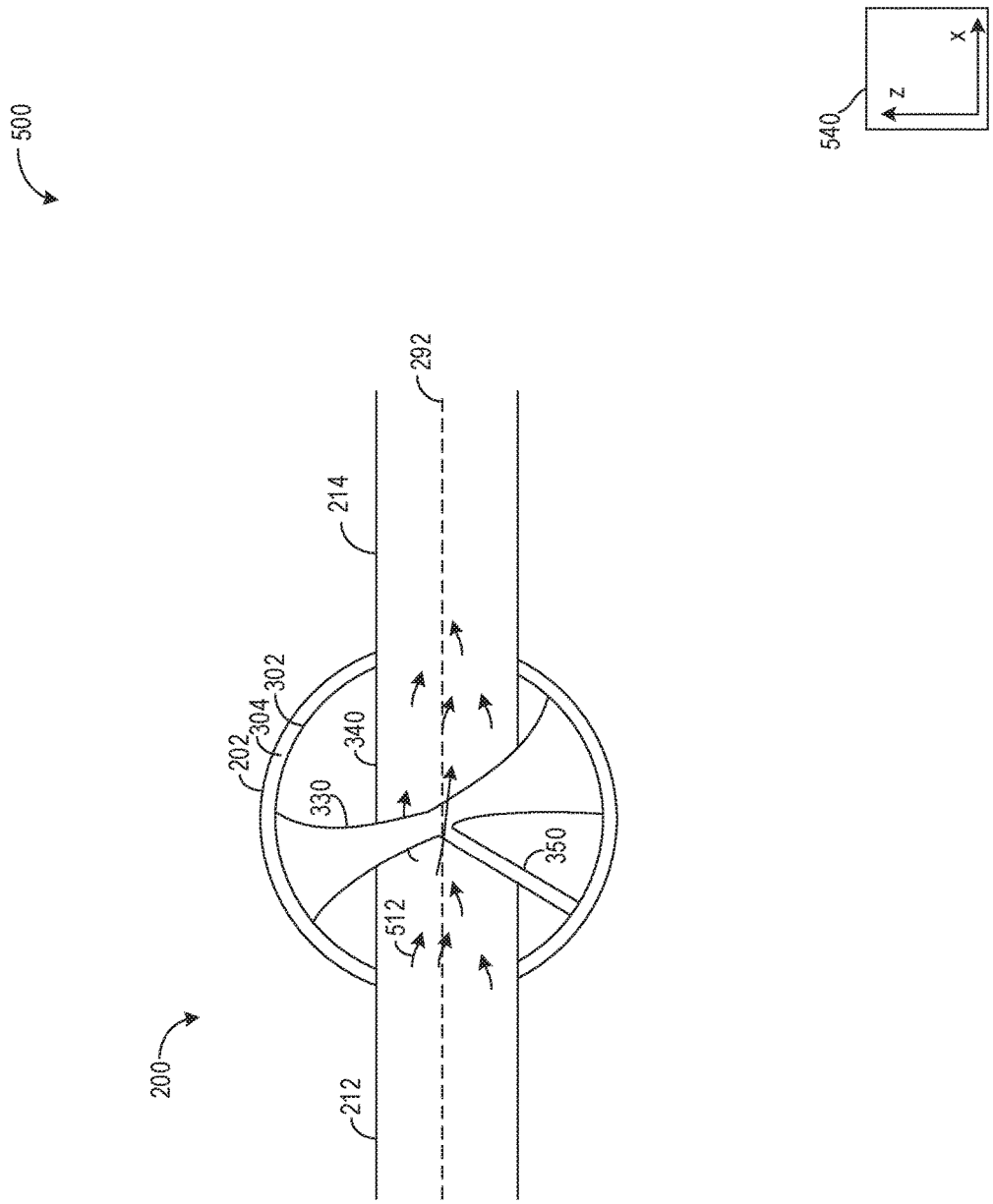

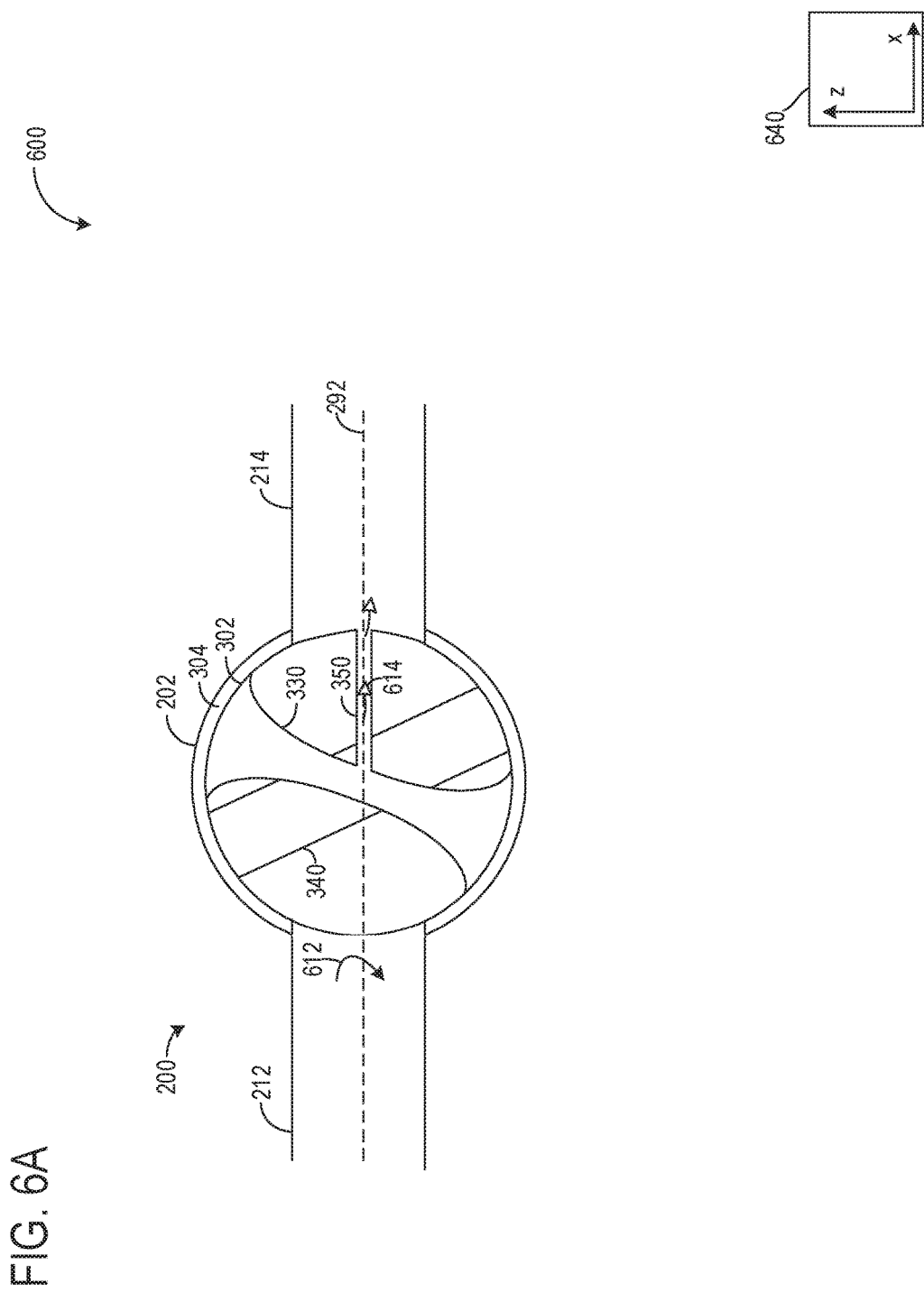

METHODS AND SYSTEM FOR A THROTTLE

FIELD

The present description relates generally to a vacuum generating throttle.

BACKGROUND/SUMMARY

Vehicle systems may include various vacuum consumption devices that are actuated using vacuum. These may include, for example, a brake booster and a purge canister. Vacuum used by these devices may be provided by a dedicated vacuum pump. In other embodiments, one or more aspirators (alternatively referred to as ejectors, venturi pumps, jet pumps, and eductors) may be coupled in the engine system that may harness engine airflow and use it to generate vacuum.

In yet another example embodiment shown by Bergbauer et al. in U.S. Pat. No. 8,261,716, a control bore is located in the wall of the intake such that when the throttle plate is at idle position, vacuum generated at the periphery of the throttle is supplied to a vacuum consumption device. Therein, the positioning of the throttle plate in an idle position provides a constriction at the throttle plate's periphery. The increasing flow of intake air through the constriction results in a venturi effect that generates a partial vacuum. The control bore is sited so as to utilize the partial vacuum for a vacuum consumption device.

The inventors herein have identified potential issues with the above approach. As an example, the vacuum generation potential of the throttle is limited. For example, a single control bore at one location in the intake, as shown in U.S. Pat. No. 8,261,716, is utilized by the vacuum consumption device even though vacuum may be generated at the entire periphery of the throttle. To use vacuum generated at the entire periphery of the throttle, more control bores may be needed in the intake passage. However, fabricating these control bores may result in significant modifications to the design of the intake passage, which can increase related expenses.

In the approaches that use one or more aspirators to generate vacuum, additional expenses may be incurred because of individual parts that form the aspirator including nozzles, mixing and diffusion sections, and check valves. Further, at idle or low load conditions, it may be difficult to control the total airflow rate into the intake manifold since the flow rate is a combination of leakage flow from the throttle and airflow from the aspirator. Typically, an aspirator shut off valve (ASOV) may be included along with the aspirator to control airflow but with added cost. Further, installing aspirators in the intake can lead to constraints on space availability as well as packaging issues.

In one example, the issues described above may be addressed by a method for pivoting a spherical throttle to align one of a plurality of passages arranged interior to the throttle with an intake passage of an engine. In this way, a desired amount of vacuum may be supplied to a vacuum consumption device based on the one of the plurality of passages selected, wherein the selection may be based on an engine load and/or vacuum stored in a reservoir of the vacuum consumption device.

As one example, the throttle comprises at least a first passage, a second passage, and a third passage, each configured to align with one or more portions of the intake passage. A diameter of the throttle may be greater than a diameter of the intake passage, thereby separating the intake passage into upstream and downstream passages relative to the throttle via a gap. The upstream and downstream passages may be fluidly separated from one another when one or more of the passages interior to the throttle is misaligned with the upstream and downstream passages. Thus, one or more of the passages located interior to the throttle may bridge the upstream and downstream passages and fill the gap located therebetween. The first, second, and third passages may be differently shaped than one another, thereby allowing the passages to provide disparate intake airflow rates to the engine and vacuum flow rates to a vacuum consumption device. One of the first, second, and third passages may be aligned with the upstream and downstream passages of the intake passage based on a pivoting of the throttle about an axis of a shaft coupled to the throttle. In this way, actuation of the passages is limited, thereby increasing a durability of the vacuum generating throttle compared to other throttle designs, such as the designs described above having sliding components, which may experience a greater amount of friction. Additionally, the throttle is compact and easy-to-install via welds or other similar techniques known in the art.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 4A and 4B show cross-sectional views along different planes of the throttle in a first position.

FIGS. 5A and 5B show cross-sectional views along different planes of the throttle in a second position.

FIGS. 6A and 6B shows cross-sectional views along different planes of the throttle in a third position.

FIGS. 2-6B are shown approximately to scale

DETAILED DESCRIPTION

Figure 1:
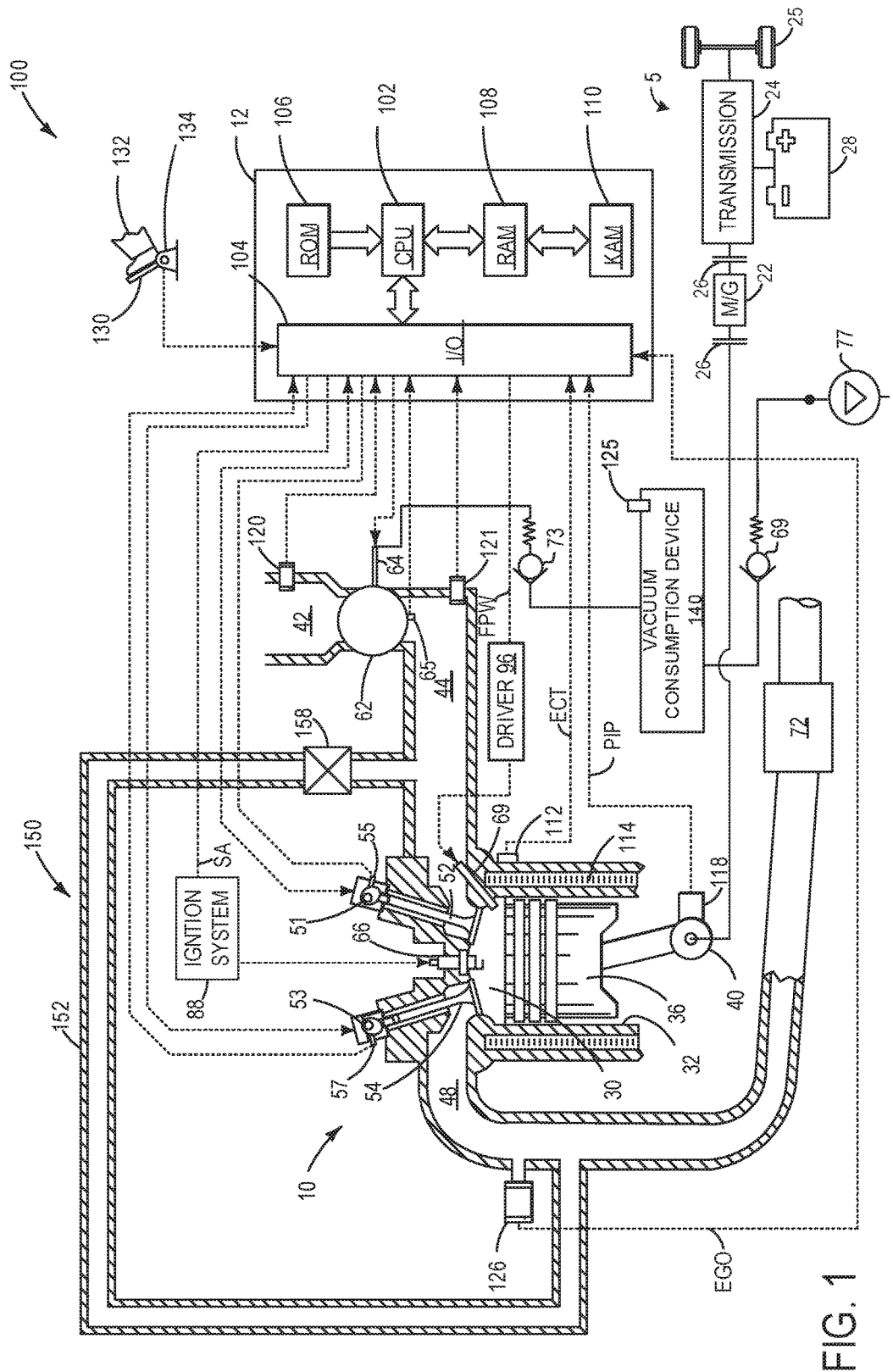
FIG. 1 shows a single cylinder of an engine.

The following description relates to systems and methods for a throttle located between upstream and downstream portions of an intake passage. The throttle may be sized to have a length and/or height and/or width greater than a length and/or height and/or width of the intake passage. In one example, the throttle is spherical. The throttle divides the intake passage into upstream and downstream passages, where the downstream passage directs intake gas to an engine having at least a cylinder as shown in FIG. 1.

Figure 2:
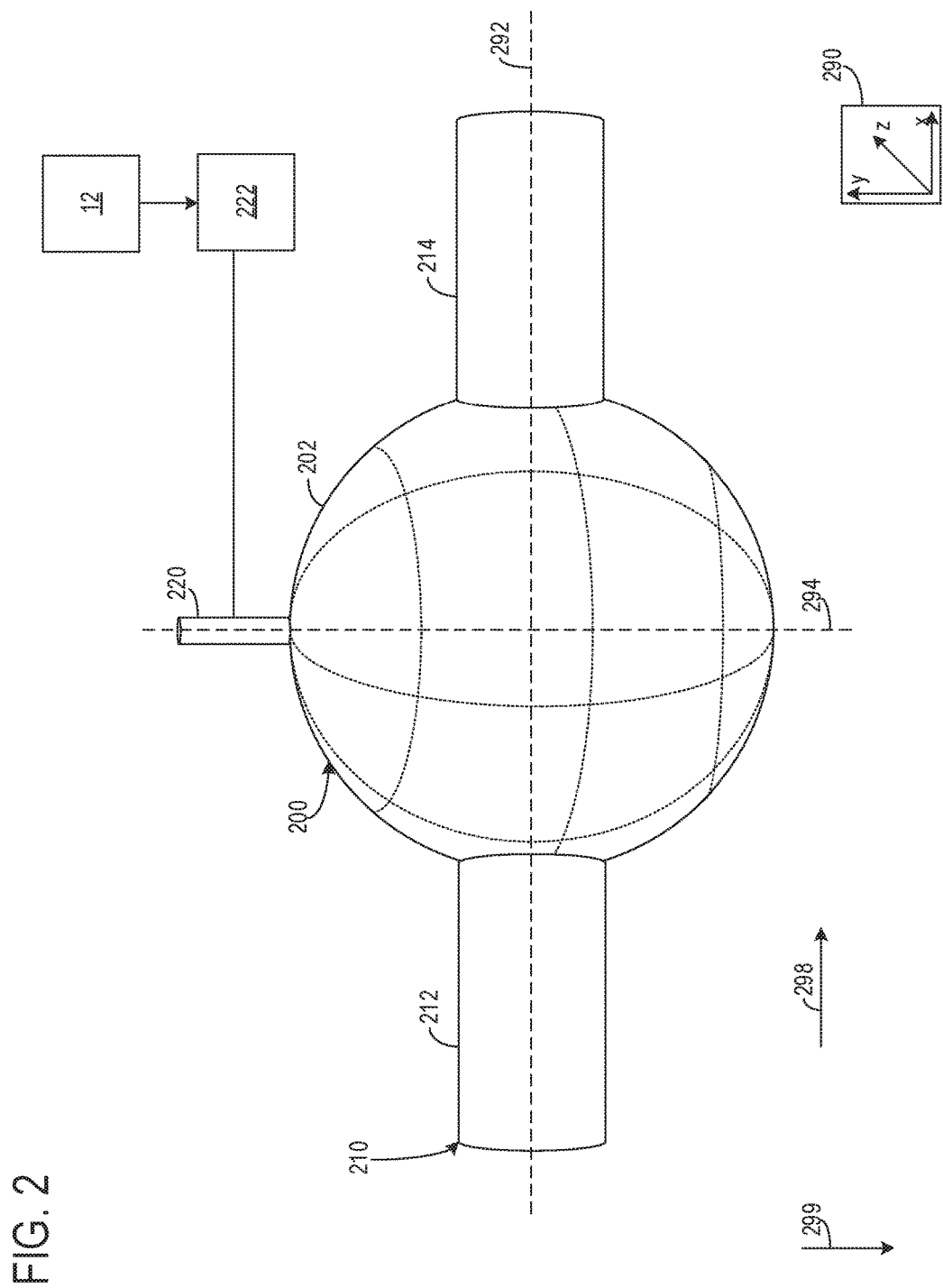
FIG. 2 shows an isometric view of a throttle coupled to an intake passage.
Figure 3:
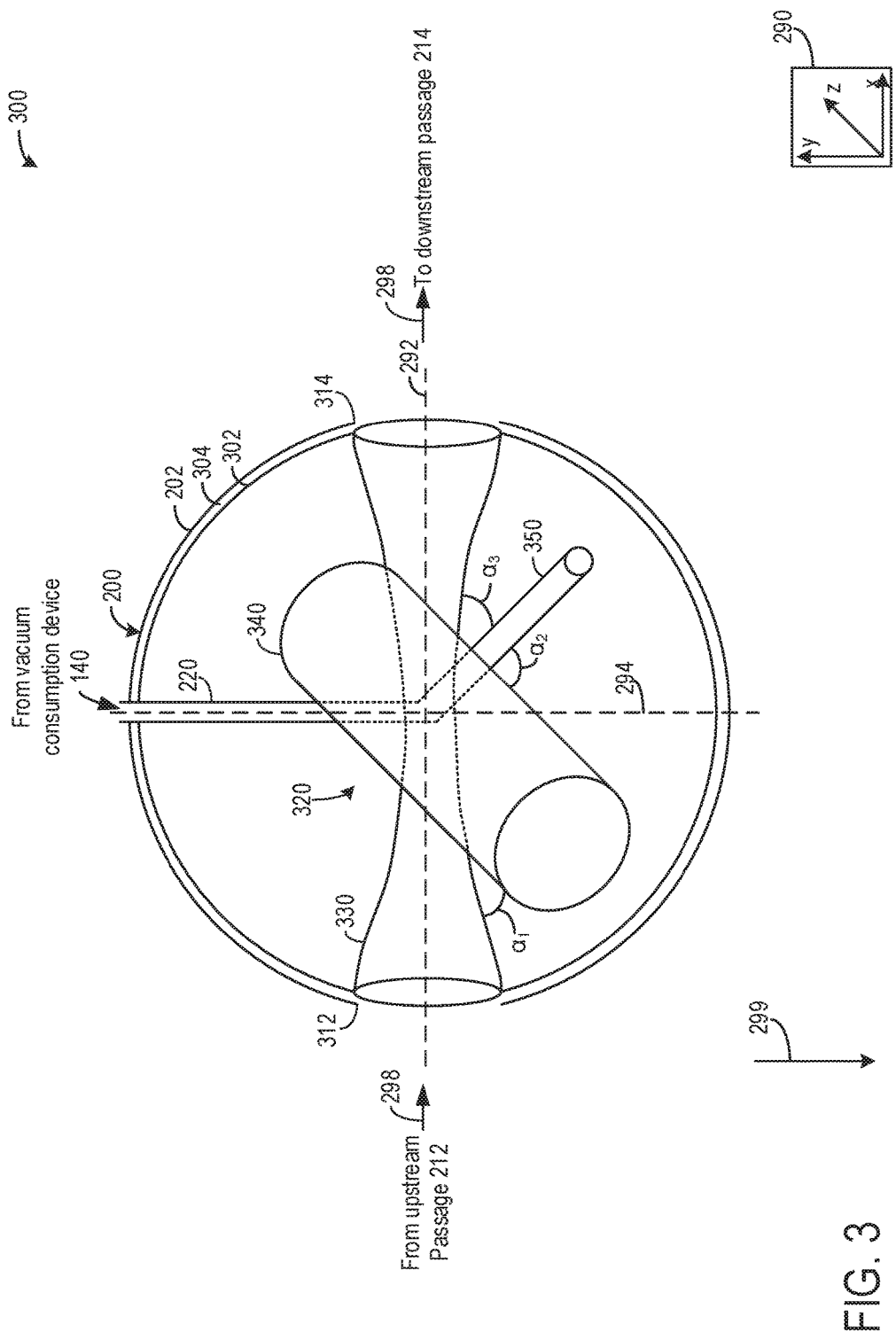
FIG. 3 shows a cross-sectional view of the throttle including one or more of the passages located interior thereto.

An embodiment of the throttle is shown in FIG. 2, wherein the throttle is spherical and physically coupled to the upstream and downstream passages at its outer surface. As such, the outer surface of the throttle is fixed to the upstream and downstream passages. FIG. 3 illustrates an interior portion of the throttle which is pivotally coupled to the outer surface such that the interior portion may be actuated. The interior portion may comprise a plurality of passages configured to provide varying amount of intake gas to the downstream passage. The passages may also adjust an amount of vacuum directed to a vacuum consumption device, wherein the vacuum flows to the vacuum consumption device via a shaft. Pivoting the throttle includes actuating the shaft. FIG. 3 further illustrates an intersection between one or more of the passages with the shaft interior to the throttle.

Figure 4A:
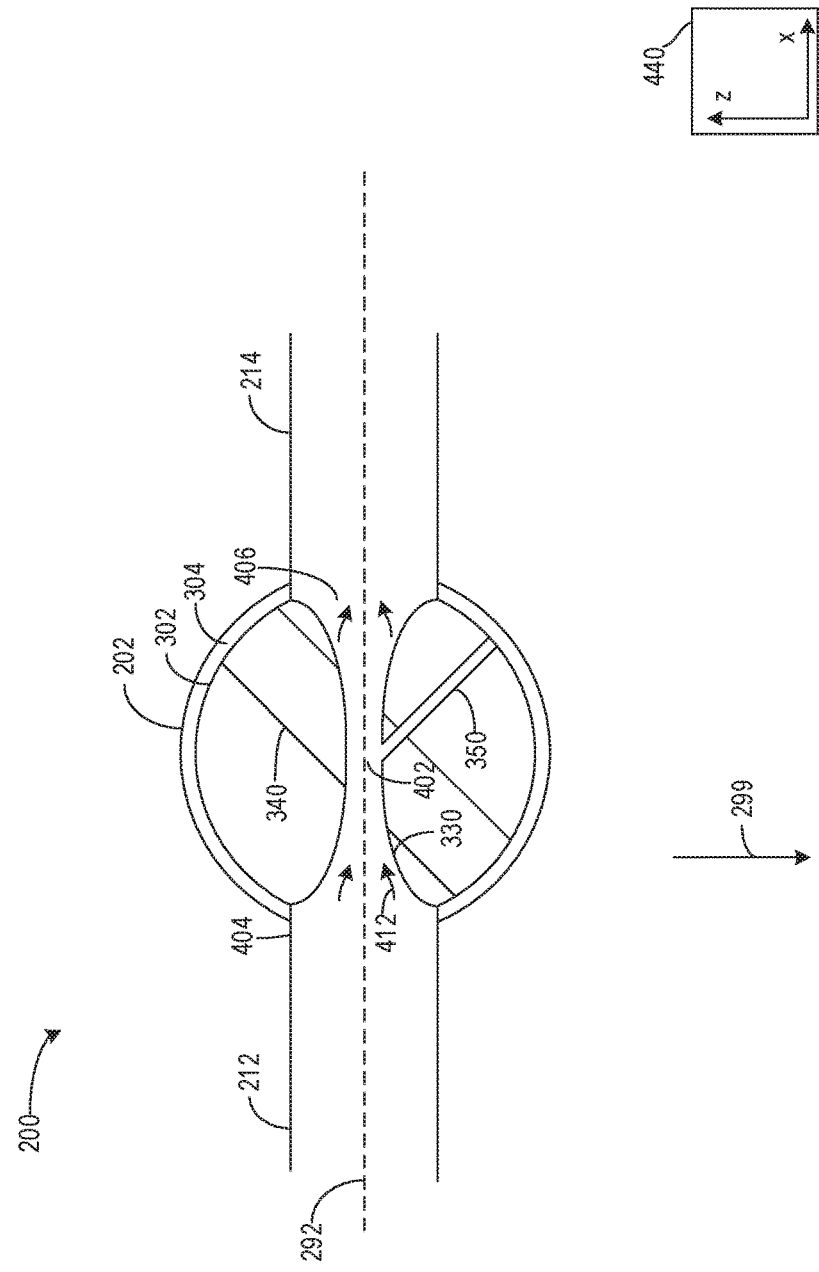

As the throttle is pivoted, passages within the throttle are reoriented to align with the upstream and downstream passages. FIGS. 4A and 4B show cross-sectional views and example flows of intake gas through the passages of the throttle being arranged in a first position. A venturi passage may be located in the throttle and align with the upstream and downstream passages when the throttle is pivoted to the first position. In one example, the venturi passage may fluidly couple the upstream and downstream passage while simultaneously providing at least some vacuum to a vacuum consumption device.

Figure 5B:
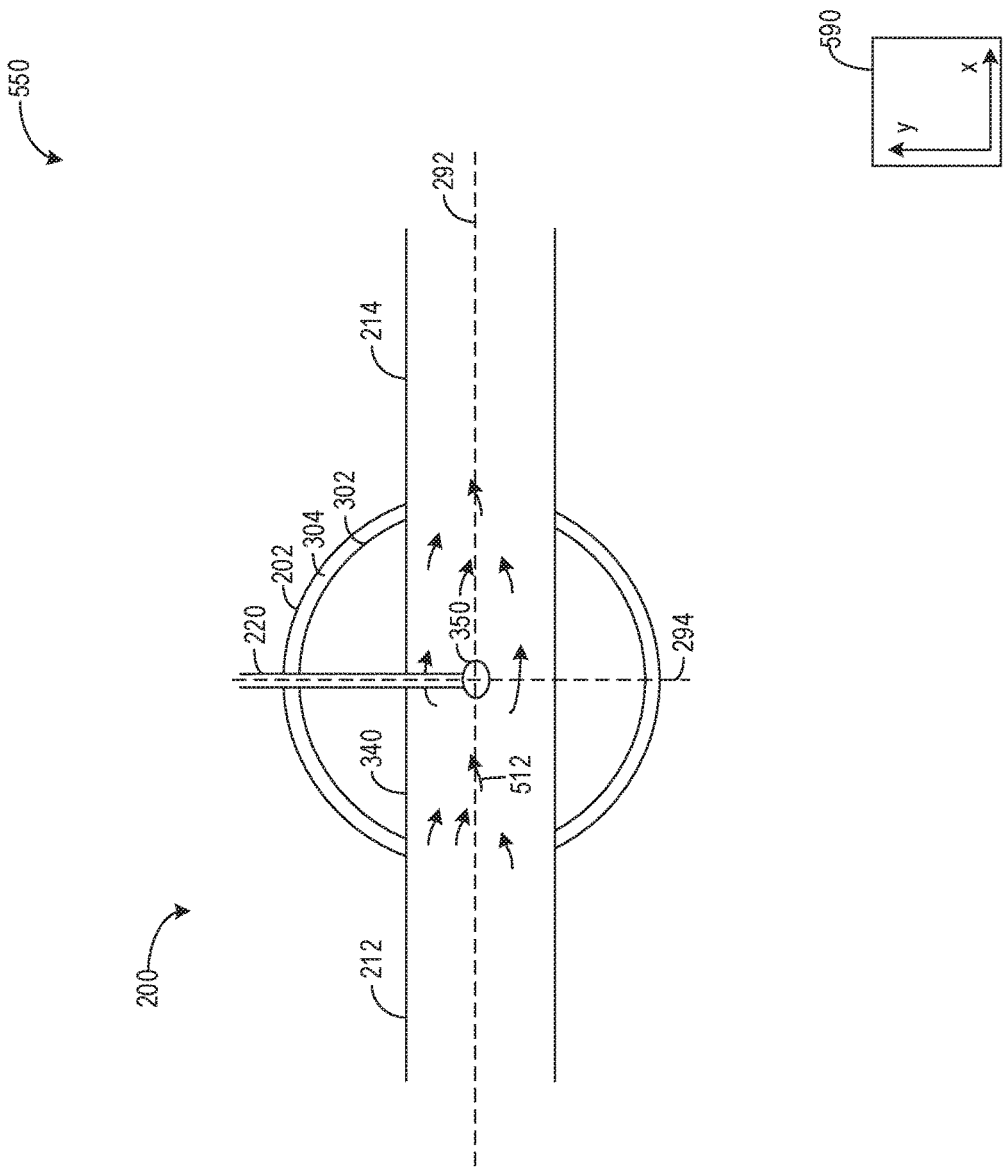

FIGS. 5A and 5B show cross-sectional views and example flows of intake gas through a passage of the throttle being arranged in a second position. A first tubular passage may be aligned with the upstream and downstream passages when the throttle is pivoted to the second position. The tubular passage may fluidly couple the upstream passage to the downstream passage.

Figure 6B:
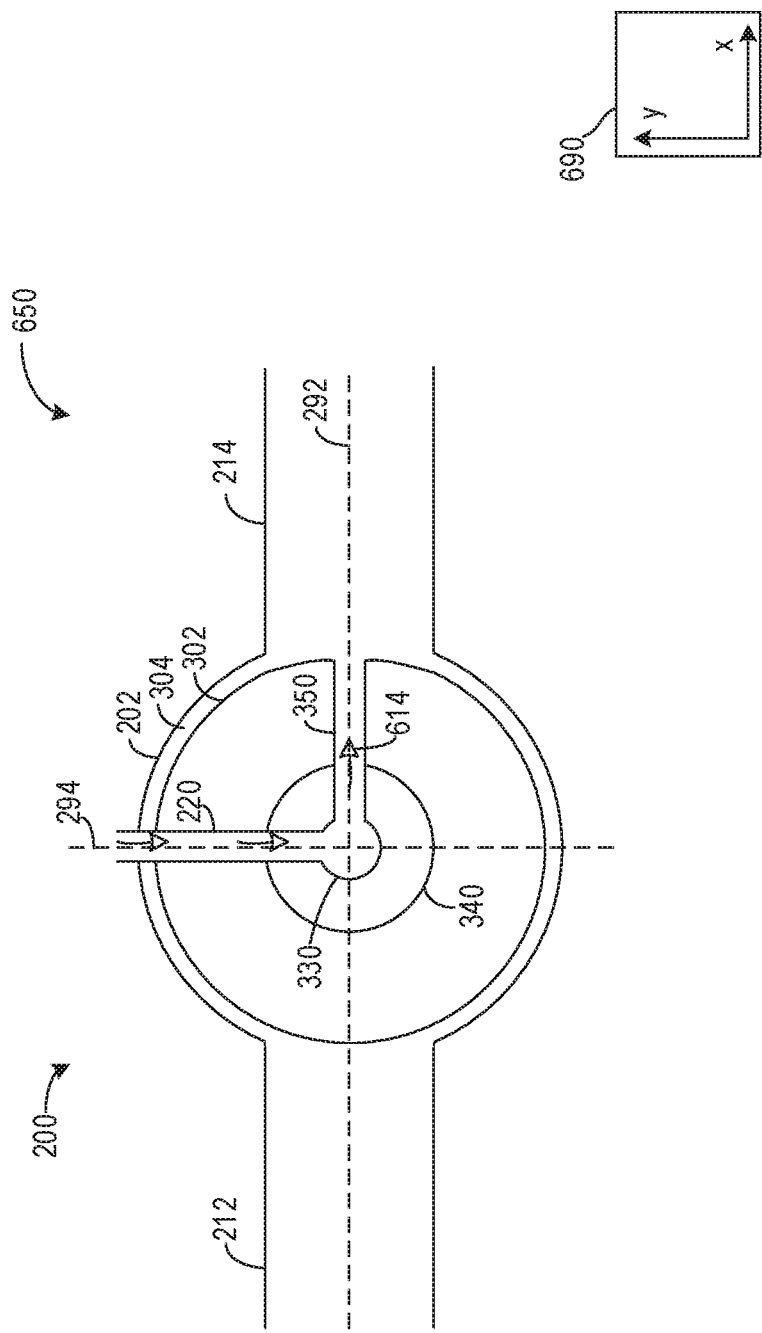

FIGS. 6A and 6B show cross-sectional views and example flows of intake gas through a passage of the throttle being arranged in a third position. A second tubular passage may align with the upstream and downstream passage when the throttle is pivoted to the third position. The second tubular passage may fluidly couple the downstream passage to the vacuum consumption device.

Figure 7:
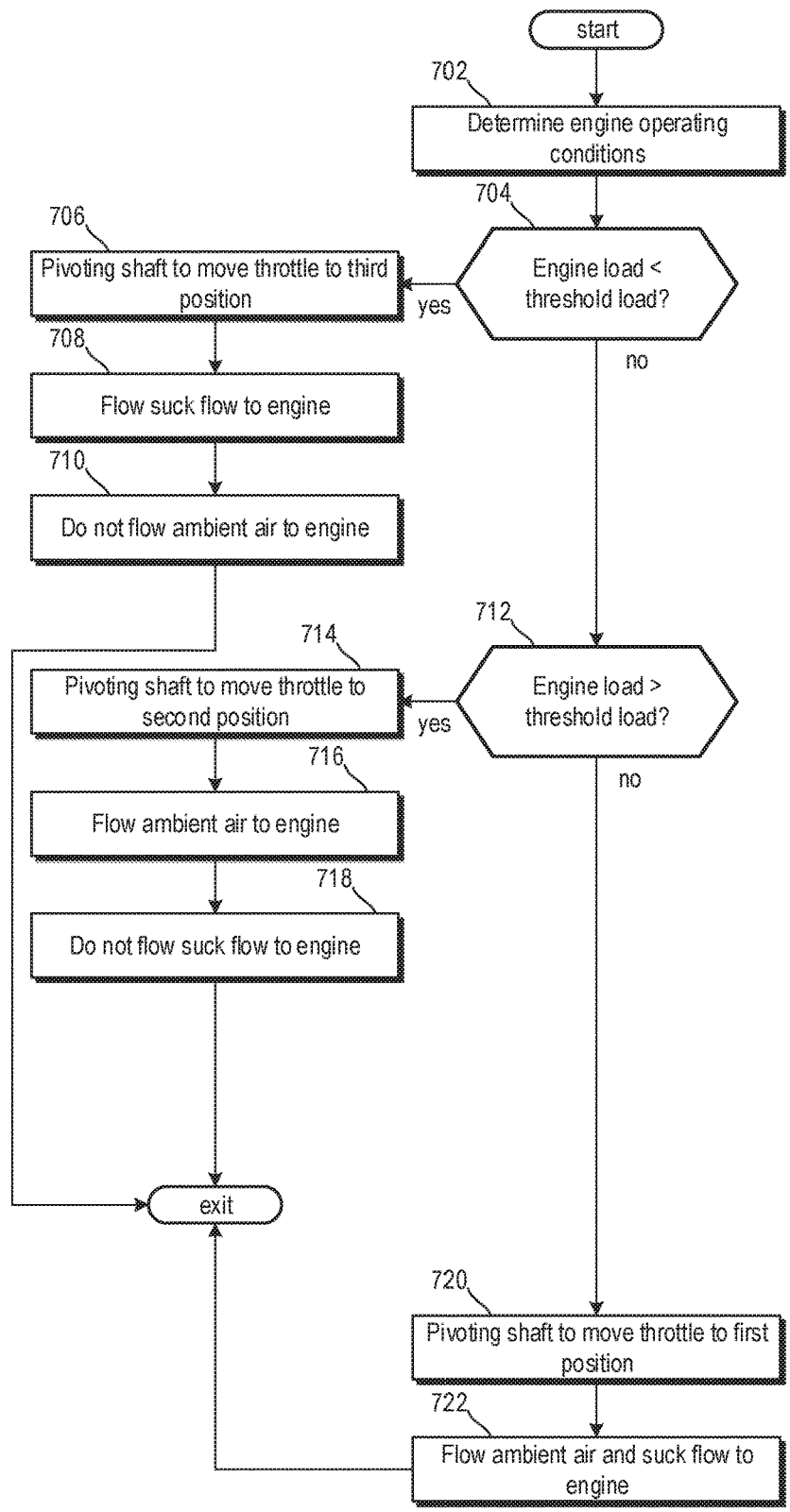
FIG. 7 shows a method for pivoting the throttle based on conditions.

A method for adjusting a position of the throttle is shown in FIG. 7. The method may include pivoting the throttle to the first position in response to an engine load being substantially equal to a threshold load. If the engine load is less than the threshold load, then the throttle may be pivoted to the third position. Lastly, if the engine load is greater than the threshold load, then the throttle may be pivoted to the second position.

FIGS. 1-6B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Referring now to FIG. 1, it shows a schematic depiction of a spark ignition internal combustion engine 10. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion chamber 30 (also known as, cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 96. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Engine 10 may further include a compression device such as a turbocharger or supercharger including at least a compressor arranged along intake passage 42. Compressor draws air from intake passage 42 to supply a boost chamber. Exhaust gases spin turbine which is coupled to compressor via shaft. For a supercharger, compressor may be at least partially driven by the engine and/or an electric machine, and may not include a turbine. Thus, the amount of compression provided to one or more cylinders of the engine via a turbocharger or supercharger may be varied by controller 12. The compressor may be located upstream of a throttle 62. However, in the embodiment of FIG. 1, the compressor and the turbine are not shown.

Intake manifold 44 is shown communicating with throttle 62 having a shaft 64. In this particular example, an actuation of shaft 64 may be varied by controller 12 via a signal provided to an electric motor or actuator (not shown in FIG. 1) coupled to the shaft. Throttle position may be varied by the electric motor via a shaft. Shaft 64 may be at least partially hollow and may include an opening, which fluidly couples the throttle with vacuum consumption device 140. Throttle 62 may control airflow from intake passage 42 to intake manifold 44 and combustion chamber 30 among other engine cylinders. The throttle may be pivoted by actuating the shaft 64, which may adjust one or more of airflow and/or intake gas to the engine 10 and vacuum provided to the vacuum consumption device 140.

Engine 10 is coupled to vacuum consumption device 140 which may include, as non-limiting examples, one of a brake booster, a fuel vapor canister, and a vacuum-actuated valve (such as a vacuum-actuated wastegate and/or EGR valve). Vacuum consumption device 140 may receive vacuum from a plurality of vacuum sources. One source may be vacuum pump 77 that may be selectively operated via a control signal from controller 12 to supply vacuum to vacuum consumption device 140. Check valve 69 allows air to flow to vacuum pump 77 from vacuum consumption device 140 and limits airflow to vacuum consumption device 140 from vacuum pump 77. Another source of vacuum may be shaft 64 which is arranged along intake passage 42. Shaft 64 has multiple perforations at its periphery, in one example. As shown in FIG. 1, an opening within shaft 64 may be connected to vacuum consumption device 140. When shaft 64 actuates the throttle 62 to a first position or a third position, vacuum may be generated in the throttle 62 and supplied through the shaft 64 to the vacuum consumption device 140. This vacuum may draw air from vacuum consumption device 140, through the shaft 64, and into the throttle 62. This air may then flow out of the throttle 62 and toward the engine 10. Check valve 73 ensures that air flows from vacuum consumption device 140 to shaft 64 and thereon into intake manifold 44 and not from intake manifold 44 to vacuum consumption device 140.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three-way catalyst (TWC), NOx trap, various other emission control devices, or combinations thereof.

An exhaust gas recirculation (EGR) system 150 may be used to route a desired portion of exhaust gas from exhaust passage 48 to intake manifold 44 through conduit 152 via EGR valve 158. Alternatively, a portion of combustion gases may be retained in the combustion chambers, as internal EGR, by controlling the timing of exhaust and intake valves. As shown, the EGR passage 152 provides exhaust gas to the intake manifold at a location downstream of the throttle 62. Thus, EGR does not flow directly into the throttle 62. Said another way, the throttle 62 does not receive exhaust gas in the embodiment shown.

In some examples, a compressor may be arranged upstream of the throttle 62 such that the EGR system 150 is a high-pressure EGR system. As such, a turbine, mechanically coupled to the compressor, may be arranged between the EGR passage 152 and the aftertreatment device 72 in the exhaust passage 48.

Additionally or alternatively, a low-pressure EGR passage may be included in the system 100. As such, the low-pressure EGR passage may be fluidly coupled to a portion of the intake passage 42 upstream of a compressor and the throttle 62. In such an example, exhaust gas may flow through the throttle 62 via the intake passage 42. Thus, exhaust gas does not flow directly to the throttle 62.

In some embodiments, the shaft 64 may be fluidly coupled to both the vacuum consumption device 140 and an EGR passage. A control valve may be arranged therein to control vacuum supplied from the shaft 64 to one or more of the vacuum consumption device 140 and the EGR passage. For example, when EGR is desired and the vacuum consumption device does not demand vacuum, the control valve may move to a position such as to prevent vacuum flow to the vacuum consumption device 140 while allowing vacuum flow to the EGR passage. This may promote EGR flow into the intake passage 42 or intake manifold 44. The control valve may further comprise positions for flowing vacuum to only the vacuum consumption device 140 and for flowing vacuum to both the vacuum consumption device 140 and the EGR passage.

Controller 12 is shown in FIG. 1 as a conventional microcomputer including: microprocessor unit 102, input/output ports 104, read-only memory 106, random access memory 108, keep alive memory 110, and a conventional data bus. Controller 12 commands various actuators such as throttle plate 64, EGR valve 158, and the like. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by vehicle operator 132; a measurement of engine manifold pressure (MAP) from pressure sensor 121 coupled to intake manifold 44; a measurement of vacuum in vacuum consumption device 140 from pressure sensor 125, a profile ignition pickup signal (PIP) from Hall effect sensor 118 (or other type) coupled to crankshaft 40; and a measurement of air mass entering the engine from mass airflow sensor 120. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

The controller 12 receives signals from the various sensors of FIG. 1 and employs the various actuators of FIG. 1 to adjust engine operation based on the received signals and instructions stored on a memory of the controller. For example, adjusting the throttle plate may include adjusting an actuator of the throttle plate to adjust a position of the throttle plate. As an example, the actuator may be signaled to move the throttle plate to a more open position in response to a tip-in (e.g., accelerator pedal 130 in a more depressed position).

As described above, FIG. 1 merely shows one cylinder of a multi-cylinder engine, and that each cylinder has its own set of intake/exhaust valves, fuel injectors, spark plugs, etc. Also, in the example embodiments described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time.

The controller 12 receives signals from the various sensors of FIG. 1 and employs the various actuators of FIG. 1 to adjust engine operation based on the received signals and instructions stored on a memory of the controller. For example, the throttle position 62 may be based on one or more of feedback from the position sensor 134 and feedback from a pressure sensor arranged in the vacuum consumption device 140.

In some examples, vehicle 5 may be a hybrid vehicle with multiple sources of torque available to one or more vehicle wheels 25. In other examples, vehicle 5 is a conventional vehicle with only an engine, or an electric vehicle with only electric machine(s). In the example shown, vehicle 5 includes engine 10 and an electric machine 22. Electric machine 22 may be a motor or a motor/generator. Crankshaft 40 of engine 10 and electric machine 22 are connected via a transmission 24 to vehicle wheels 25 when one or more clutches 26 are engaged. In the depicted example, a first clutch 26 is provided between crankshaft 40 and electric machine 22, and a second clutch 26 is provided between electric machine 22 and transmission 24. Controller 12 may send a signal to an actuator of each clutch 26 to engage or disengage the clutch, so as to connect or disconnect crankshaft 40 from electric machine 22 and the components connected thereto, and/or connect or disconnect electric machine 22 from transmission 24 and the components connected thereto. Transmission 24 may be a gearbox, a planetary gear system, or another type of transmission. The powertrain may be configured in various manners including as a parallel, a series, or a series-parallel hybrid vehicle.

Electric machine 22 receives electrical power from a traction battery 28 to provide torque to vehicle wheels 25. Electric machine 22 may also be operated as a generator to provide electrical power to charge battery 28, for example during a braking operation.

Turning now to FIG. 2, it shows an embodiment of a throttle 200 arranged along an intake passage 210. In one example, the throttle 200 may be used substantially similarly to the throttle 62 of FIG. 1. As such, intake passage 210 may be substantially similar to the intake passage 42. The intake passage 210 may conduct intake gas to an engine for some positions of the throttle 200. In one example, intake gas includes only ambient air. In other examples, intake gas may refer to a mixture of ambient air mixed with exhaust gas. Additionally or alternatively, the intake gas may be compressed in some examples. Additionally, vacuum may be supplied to a vacuum consumption device (e.g., vacuum consumption device 140 via one or more of the passages arranged interior to walls of the throttle 200.

An axis system 290 comprising three axes, namely an x-axis parallel to a horizontal direction, a y-axis parallel to a vertical direction, and a z-axis perpendicular to both the x- and y-axes is shown. A direction of gravity 299 is shown extending parallel to the negative y-axis direction. Arrow 298 indicates a general direction of intake gas flow through the intake passage 210 and the throttle 200. As shown, intake gas flows in a direction substantially parallel to a central axis 292 of the intake passage 210. An axis 294 passes through a shaft 220 in a direction perpendicular to arrow 298 (e.g., the direction of intake gas flow). The shaft 220 may be fluidly coupled to the vacuum consumption device 140. Furthermore, the shaft 220 may be coupled to an actuator 222. The actuator 222 may be powered mechanically, electrically, pneumatically, or the like. In one example, the actuator 222 receives signals from a controller (e.g., controller 12 of FIG. 1) to actuate the shaft 220 in response to conditions. This may result in one or more passages arranged within walls of the throttle 200 to pivot about the axis 294. Thus, the passages pivot about an axis (e.g., axis 294) perpendicular to the direction of intake gas flow. The shaft 220 may be substantially similar to the shaft 64 of FIG. 1. As such, the shaft 220 may be coupled to vacuum consumption device 140 in some embodiments.

The conditions may be based on one or more of an accelerator pedal position (e.g., pedal 130 of FIG. 1) or an amount of vacuum stored in the vacuum consumption device. The throttle 200 may be configured to provide various amounts of intake air through the intake passage 210 while simultaneously adjusting vacuum provided to the vacuum consumption device. In one example, throttle 200 is the only throttle arranged in the intake passage 42. As such, there is no other throttle, other than the throttle 200, arranged in the intake passage 42 to adjust intake gas flow. In other embodiments, there may be a second throttle arranged upstream or downstream of the throttle 200, wherein the second throttle is a flap valve as known by those skilled in the art.

The throttle 200 divides the intake passage 210 into two, separate portions. Specifically, the intake passage 210 comprises a first passage 212 and a second passage 214, which may be arranged on exactly opposite sides of the throttle 200. The first passage 212 is upstream of the throttle 200 and the second passage 214 is downstream of the throttle 200 relative to the direction of intake gas flow (arrow 298). As such, the first passage 212 directs intake gas to the throttle 200 and the second passage directs intake gas from the throttle 200 to remaining portions of the intake system (e.g., intake manifold 44 or engine 10 of FIG. 1). Herein, the first passage 212 may be referred to as upstream passage 212 and the second passage 214 may be referred to as downstream passage 214.

It will be appreciated by those skilled in the art that EGR may flow directly into the upstream passage 212 or the downstream passage 214 without departing from the scope of the present disclosure.

In some examples, the upstream 212 and downstream 214 passages are not arranged along opposite sides of the throttle 200 along the central axis 292. As such, the upstream 212 and downstream 214 passages may be misaligned with one another at different radial positions of the throttle 200. In such an example, the one or more passages may be shaped to accommodate this misalignment.

The upstream 212 and downstream 214 passages are substantially identical in shape and size. In one example, a cross-sectional flow-through area, taken along the Y-Z plane, of the upstream 212 and downstream 214 passages is substantially uniform along the x-direction. Thus, there may be no constrictions and/or expansions in the upstream 212 and downstream 214 passages.

The throttle 200 may comprise rounded walls and/or surfaces. In one example, the throttle 200 is spherical. As such, the throttle 200 comprises a circular cross-section along each of the X-Y, X-Z, and Y-Z planes. In some examples, the throttle 200 may be elliptical, pyramidal, cubical, and the like. At any rate, the surfaces of the throttle 200 may remain rounded to allow easy pivoting of the one or more passages arranged therein.

The throttle 200 may be comprised of aluminum, steel, iron, plastic(s), ceramic, silicon derivatives, the like, and/or a combination thereof. In one example, the throttle 200 and the passages located therein are comprised of a material similar to materials of the intake passage 210. The throttle 200 may be hollow with one or more passages located therein, wherein the passages are fluidly separated from the hollow space located within the throttle 200. Alternatively, the throttle 200 is solid and the one or more passages are machined into the throttle. At any rate, the upstream 212 and downstream 214 passages are fluidly disconnected until one of the one or more passages inside the throttle 200 is coupled to the upstream 212 and downstream 214 passages.

The throttle 200 may be physically coupled to the upstream 212 and downstream 214 passages via one or more of welds, fusions, adhesives, screws, and the like. The coupling between the throttle 200 and the upstream 212 and downstream 214 passages may prevent gas from flowing through the intersections between the throttle 200 and the upstream 212 and downstream 214 passages to an ambient atmosphere and/or to an engine. As such, the throttle 200 may be fixedly coupled to the upstream 212 and downstream 214 passages via an outer shield 202. The throttle 200 may further comprise an inner surface configured to pivot within the outer shield 202 based on an actuation of the shaft 220. The outer shield 202 and inner surface are described in detail with respect to FIG. 3.

A diameter of the throttle 200, and therefore the outer shield 202, is greater than a diameter of the intake passage 210. This may allow the throttle 200 to house one or more passages pivotally arranged within the throttle 200. As will be described below, one or more of the passages may be sized similarly to the upstream 212 and downstream 214 passages while still being configured to pivot within a space interior to the outer shield 202 with little to no resistance.

The shaft 220 may be physically coupled to the throttle 200 via one or more of welds, fusions, adhesives, screws, and the like. Specifically, the shaft 220 may be physically coupled to the inner surface while extending through a bore or the like arranged at the outer surface. In this way, the shaft 220 may extend through the outer surface of the throttle 200 and into an interior of the throttle 200, wherein actuation of the shaft 220 may realize a pivoting of the inner surface and the one or more passages arranged interior to the throttle 200. The shaft 220 may be cylindrical and hollow. A passage of the shaft may fluidly couple one or more of the passages located interior to the throttle 200 to the vacuum consumption device. In this way, the shaft 220 may be actuated to pivot the one or more passages within the throttle about the axis 294 while also fluidly connecting the passages to the vacuum consumption device.

Turning now to FIG. 3, it shows a perspective view 300 exposing interior components of the throttle 200. As such, components previously introduced may be similarly numbered in subsequent figures. Interior components illustrated in small dash lines are obscured by other portions of the interior components. As such, illustrations in small dash lines would otherwise be unseen. Small dash lines are smaller than large dash lines, wherein large dash lines are used to illustrate the axes of FIG. 2 (e.g., central axis 292 and axis 294). As shown, the central axis 292 and the axis 294 perpendicularly intersect at an exact center of the throttle 200. The axis system 290 is further included in the perspective view 300.

In the interior perspective view 300 of the throttle 200, an inner surface 302 is shown radially interior to the outer shield 202. A diameter of the inner surface 302 may be less than a diameter of the outer shield 202 by a size of a gap 304 located therebetween. In some examples, the diameter of the inner surface 302 may be equal to between 95-99% of the diameter of the outer shield 202. The gap 304 may be lubricated to allow the inner surface 302 to pivot friction-free. The gap 304 may be air or vacuum filled in other examples. The gap 304 may not receive gases from any of the passages 320 or the upstream 212 and downstream 214 passages. As such, the gap 304 may be hermetically sealed from the upstream 212 and downstream 214 passages. By reducing an amount of friction experienced by the inner surface 302, the throttle 200 may be used in a variety of engine systems, including engine systems comprising a turbocharger or supercharger. As such, the throttle 200 may receive high-pressure boost air from the upstream passage 212 while still pivoting to a desired position.

Two cutouts may be diametrically opposed on the outer shield 202 along the central axis 292 corresponding to the upstream 212 and downstream 214 passages. Thus, the cutouts are 180° to one another. Specifically, there is a first cutout 312 directly aligned with the upstream passage 212, where a diameter (e.g., opening size) of the first cutout 312 is substantially equal to the diameter of the upstream passage 212. Likewise, there is a second cutout 314 directly aligned with the downstream passage 214, where a diameter of the second cutout 314 is substantially equal to the diameter of the downstream passage 214. In one example, the first cutout 312 and the second cutout 314 comprise substantially equal diameters. Alternatively, the first 312 and second 314 cutouts may be differently sized according to the sizing of the upstream 212 and downstream 214 passages, respectively. As an example, the second cutout 314 may be larger than the first cutout 312. Since the outer shield 202 is immovable, the first cutout 312 and the second cutout 314 do not move. In this way, the first cutout 312 is coupled to the upstream passage 212 through any position of the throttle 200. Similarly, the second cutout is coupled to the downstream passage 214 through any position of the throttle 200.

In some examples, the first 312 and second 314 cutouts may be angled to one another differently than 180°. For example, the angle generated between the cutouts may be less than 180° (e.g., 60°). The cutouts may be arranged along the outer shield based on an intake system geometry. As such, the throttle 200 may be manufactured to fit a variety of differently sized and shaped intake systems.

The first cutout 312 may allow intake gas to flow into the throttle 200 and the second cutout 314 may allow intake gas to flow out of the throttle 200. While in the throttle 200, intake gas may flow through one of the one or more passages 320. In one example, the passages 320 includes exactly three passages. The passages 320 include a first passage 330, a second passage 340, and a third passage 350. Each of the passages 320 is configured to align with the central axis 292 at different positions of the throttle 200. Each of the first 330, second 340, and third 350 passages may provide disparate intake gas flow rates to an engine and amounts of vacuum to the vacuum consumption device 140.

The first passage 330 and the second passage 340 may be substantially similar in size and length. However, the first passage 330 may comprise a restriction adjacent to the axis 294, whereas the second passage 340 may comprise a substantially uniform cross-sectional flow through area along its length. As such, a cross-sectional flow through area of the first passage 330 taken along a Y-Z plane decreases from an area adjacent the first cutout 312 toward the axis 294. Additionally, the cross-sectional flow through area of the first passage, taken along the Y-Z plane, increases from the axis 294 to an area of the first passage 330 adjacent the second cutout 314. Conversely, a cross-sectional flow through area of the second passage 340, taken along the Y-Z plane, is substantially constant along the direction of exhaust gas flow. In one example, the first passage 330 is venturi shaped. Additionally, the second passage 340 is tubular (e.g., cylindrical). As shown, lengths of the first 330 and second 340 passages are substantially equal to a diameter of the inner surface 302. Thus, both the first 330 and second 340 passages are configured to fluidly couple the upstream 212 and downstream 214 passages for some positions of the throttle 200.

The third passage 350 may be substantially similar to the second passage 340 in shape. In one example, the third passage 350 is tubular or the like. However, the third passage 350 may be smaller than the second passage 340. In one example, the third passage 350 is half the length of the second passage 340 and a fraction of the diameter of the second passage 340. A length of the third passage 350 may be substantially equal to a radius of the inner surface 302. A diameter of the third passage 350 may be between 20-80% of the diameter of the second passage 340. Additionally or alternatively, the diameter of the third passage 350 is substantially equal to half a smallest diameter of the first passage 330 (e.g., the diameter of the first passage 330 along the axis 294). Additionally or alternatively, the diameter of the third passage 350 may be substantially identical to a diameter of the shaft 220. As such, a cross-sectional flow through area, taken along the Y-Z plane, is substantially uniform along the x-axis.

In the embodiment of FIG. 3, the inner surface 302 comprises exactly five cutouts, two corresponding to the first passage 330, two corresponding to the second passage 340, and one corresponding to the third passage 350. The cutouts corresponding to the first 330 and second 340 passages may be substantially identical and larger than the cutout corresponding to the third passage 350. In one example, the cutouts corresponding to the first 330 and second 340 passages may be substantially identical to the first 312 and second 314 cutouts. As such, the first 330 and second 340 passages may bridge the gap between and allow air to flow through the upstream 212 and downstream 214 passages. The cutout corresponding to the third passage 350 may couple to the second cutout 314. As such, fluid communication between the upstream passage 212 and the downstream passage 214 is prevented when the third passage 350 is aligned with the central axis 292. Additionally, the upstream 212 and downstream 214 passages are fluidly separated from one another when none of the passages 320 aligns with the central axis 292.

Specifically, the first passage 330 comprises an area of greatest restriction (e.g., smallest cross-sectional flow through area along a Y-Z plane) along its center where the central axis 292 and the axis 294 intersect. In one example, this greatest restriction provides a venturi effect and as such, low pressure generated at the constriction may draw air from the vacuum consumption device. This may replenish a vacuum of the device. The first passage 330 is described in greater detail below.

Each of the first 330, second 340, and third 350 passages are physically coupled to one another and the shaft 220 via one or more of welds, fusions, adhesives, screws, and the like. The first passage 330 and the third passage 350 may both be fluidly coupled to the shaft 220 and one another, while the second passage 340 is hermetically sealed from the shaft 220, first passage 330, and third passage 350. The first passage 330, third passage 350, and shaft 220 may intersect at a center of the throttle 200, interior to the second passage 340, where the central axis 292 and the axis 294 intersect. In one example, the shaft 220 and the third passage 350 are a single, L-shaped tube with a cutout located at the bend of tube, where the cutout may fluidly couple the tube to a most restricted portion of the first passage 330 (e.g., a venturi throat). By doing this, vacuum generated in the first passage 330 as gas flows therethrough may be provided to the vacuum consumption device 140 via the shaft 220.

As shown, an angle $\alpha_1$ is formed between the first passage 330 and the second passage 340. An angle $\alpha_2$ is formed between the second passage 340 and the third passage 350. Lastly, an angle $\alpha_3$ is formed between the third passage 350 and the first passage 330. Each of the angles $\alpha_1$, $\alpha_2$, and $\alpha_3$ may be substantially equal. In one example, each of the angles $\alpha_1$, $\alpha_2$, and $\alpha_3$ is 60°. In other examples, the angles $\alpha_1$ and $\alpha_3$ may be reduced to decrease an amount of power needed to pivot the shaft 220, thereby adjusting a position of the throttle 200. For example, if the angles $\alpha_1$ and $\alpha_3$ are decreased to 20°, then an actuator may consume two-thirds less power than when the angles $\alpha_1$ and $\alpha_3$ are 60°. The angle $\alpha_2$ is correspondingly increased when the angles $\alpha_1$ and $\alpha_3$ are decreased. As an example, a default position and/or resting position of the throttle 200 may include the first passage 330 being aligned with the central axis 292. Thus, decreasing the angles $\alpha_1$ and $\alpha_3$ may reduce an amount of power consumed to align either the second passage 340 or the third passage 350 compared to when the angles $\alpha_1$ and $\alpha_3$ are larger.

For example, the actuator (e.g., actuator 222 of FIG. 2) may be signaled to actuate the shaft 220 to pivot the passages 320 such that the second passage 340 is aligned with and fluidly coupled to the upstream 212 and downstream 214 passages. The actuating may include pivoting the second passage 340 a shortest possible distance to reach the desired position. As such, when the angle $\alpha_1$ is equal to 60°, the shaft 220 correspondingly actuated to pivot the passages 320 60° about the y-axis (e.g., axis 294). In one example, the throttle is in a first position when the first passage 330 is coupled to the upstream 212 and downstream 214 passages. A second position may include the second passage 340 being coupled to the upstream 212 and downstream 214 passages. Finally, a third position may include the third passage being coupled to the downstream passage 214. Thus, moving the throttle 200 from the first position to the second position may include actuating the shaft 220 in a clockwise direction about the axis 294. Oppositely, moving the throttle 200 from the first position to the third position may include actuating the shaft 220 in a counterclockwise direction about the axis 294. In this way, the each of the first 330, second 340, and third 350 passages is pivoted less than 90°, thereby reducing power consumption of the throttle 200. Furthermore, this pivoting may allow the throttle 200 to operate within a variety of intake system configurations. In this way, the shaft 220 may be actuated to pivot the passages 320 about the y-axis an angle equal to the angles $\alpha_1$ and $\alpha_3$.

As will be described herein, the shaft 220 and the passages 320 are pivoted based on conditions, wherein the conditions may include one or more of engine load and an amount of vacuum in a reservoir of the vacuum consumption device. The first 330 and the third passages 350 may be aligned with the central axis 292 when the amount of vacuum in the reservoir is less than a threshold amount or when engine loads are lower than a high load. However, when the amount of vacuum is greater than the threshold amount and/or when engine loads are high, the second passage 340 may be aligned with the central axis 292.

Thus, a system comprising a throttle arranged along an intake passage of an engine having first, second, and third passages located interior to an outer shield of the throttle, where the throttle pivots about an axis of a hollow shaft to adjust a coupling of the intake passage to each of the first, second, and third passages.

8. The system may further comprise where the hollow shaft is fluidly coupled to a vacuum consumption device, and where the hollow shaft sucks air from the vacuum consumption device in one or more positions of the throttle. The throttle is pivoted to a first position wherein only the first passage is fluidly coupled to upstream and downstream portions of the intake passage relative to a direction of intake airflow to the engine in response to an engine load being equal to a threshold load, and where the throttle is pivoted to a second position wherein only the second passage is fluidly coupled to upstream and downstream portions of the intake passage in response to an engine load being greater than the threshold load, and where the throttle is pivoted to a third position wherein the third passage is fluidly coupled to only the downstream portion of the intake passage in response to an engine load being less than the threshold load. The hollow shaft and the third passage fluidly couple and intersect at a greatest constriction of the first passage, interior to the second passage. The first passage is a venturi passage and the second and third passages are tubular. A diameter and a length of the second passage are greater than a diameter and a length of the third passage. The hollow shaft pivots the first, second, and third passages between 20-160° about its axis, where the axis is perpendicular to a general direction of intake airflow.

FIGS. 4A-6B illustrate different cross-sectional views of first, second, and third positions of the throttle 200. Note that FIGS. 4A-6B show arrows indicating where there is space for gas to flow, and the solid lines of the device walls show where flow is blocked and communication is not possible due to the lack of fluidic communication created by the device walls spanning from one point to another. The walls create separation between regions, except for openings in the wall which allow for the described fluid communication. Additionally, a number of arrows may be indicative of a flow rate, wherein as the number of arrows in the illustration increases, the flow rate of gas also increases.

Turning now to FIG. 4A, it shows a cross-sectional view 400 of the throttle 200 in a first position. In one example, the position of the throttle 200 in the embodiment of FIG. 3 is a first position. As such, the first position may include the first passage 330 being aligned with the central axis 292 and fluidly coupled to the upstream 212 and downstream 214 passages. The cross-sectional view 400 is taken along the X-Z plane. Therefore, the axis system 440 includes two axes, namely an x-axis parallel to the horizontal direction and a z-axis perpendicular to the horizontal direction and the direction of gravity 299. The central axis 292 is shown extending in the horizontal direction parallel to the x-axis.

In the first position, the first passage 330 is fluidly coupled to the upstream passage 212 and the downstream passage 214. The upstream passage 212 feeds intake gas to the first passage 330, where the intake gas flows through the first passage 330 and into the downstream passage 214, as indicated by arrows 412. As the intake gas flows through the restriction 402, pressure at the restriction is decreased. Herein, the restriction 402 is referred to as venturi throat 402. Intake gas initially flows through a venturi inlet 404, before flowing through the venturi throat 402, and out a venturi outlet 406 to the downstream passage 214. In one example, the venturi inlet 404 may only couple to the upstream passage 212 and the venturi outlet 406 may only couple to the downstream passage 214 due to the pivoting range of the shaft of the throttle 200.

The venturi throat 402 is fluidly coupled to the third passage 350 and the shaft. The venturi throat 402 may supply vacuum to both the third passage 350 and the shaft. However, since the third passage 350 is offset with the central axis 292, the third passage 350 may be filled with vacuum from the third passage 350 (e.g., vacated of air).

Turning now to FIG. 4B, it shows a cross-sectional view 450 of the throttle 200 in the first position. The cross-sectional view 450 is taken along an X-Y plane of the throttle 200 depicted in FIG. 3. As such, the axis system 490 includes the x- and y-axes previously presented in axis system 290 of FIG. 2. Intake air and vacuum induced airflow are depicted via black-filled arrowheads 412 and white-filled arrowheads 414, respectively. Vacuum induced airflow may refer to gas (e.g., air) flowing out of the vacuum consumption device to another device (e.g., throttle 200). When vacuum induced airflow is flowing, an amount of vacuum stored in a vacuum reservoir of the vacuum consumption device may increase. However, when vacuum induced airflow is not flowing, the vacuum consumption device may be fluidly sealed from the throttle 200 or the vacuum supplied to the vacuum consumption device from the throttle 200 may not be sufficient (e.g., vacuum supplied is less than the vacuum stored in the vacuum reservoir of the vacuum consumption device). Nonetheless, when vacuum induced airflow is not flowing, vacuum stored in the vacuum reservoir of the vacuum consumption device does not increase.

Thus, when in the first position, the first passage 330 is fluidly coupled to the upstream 212 and downstream 214 passages. Intake gas flows to the first passage 330, where the intake gas may mix with vacuum induced airflow from the vacuum consumption device as intake gas flows through the venturi throat 402. By doing this, the first position provides some amount of intake gas and vacuum induced airflow to the downstream passage 214, which directs the mixture of intake gas and vacuum induced airflow to an engine.

Turning now to FIG. 5A, it shows a cross-sectional view 500 along an X-Z plane of the throttle 200 in a second position. The second passage 340 may align with the central axis 292. As such, the upstream 212 and downstream 214 passages are fluidly coupled via the second passage 340. An x-axis and a z-axis of the X-Z plane are included in axis system 540. The axis system 540 is substantially similar to axis system 440 of FIG. 4A.

Arrows 512 illustrate intake gas flow from the upstream passage 212, through the second passage 340, and into the downstream passage 214. As shown by the number of arrows 512, a gas flow rate and/or mass flow through the second passage 340 is high, relative to the flow rate and/or mass flow through the first passage 330 of FIGS. 4A and 4B. The intake gas may flow around outer surfaces of the first 330 and third 350 passages, which are shown intersecting interior to surfaces of the second passage 340. While in the second position, intake gas does not flow through the first passage 330. Additionally, intake gas does not flow through the third passage 350 when the throttle 200 is in the second position. Furthermore, vacuum induced airflow is not illustrated in the cross-sectional view due to a limited amount of (e.g., zero) vacuum being generated within the second passage 340 when the throttle 200 is in the second position. As such, vacuum in the vacuum consumption device may not be replenished when the throttle is in the second position. Specifically, when the throttle 200 is in the second position, vacuum induced airflow may not occur due to one or more of the second passage 340 being hermetically sealed from the vacuum consumption device and the second passage 340 producing little to no vacuum.

Turning now to FIG. 5B, it shows a cross-sectional view 550 along an X-Y plane of the throttle 200 in the second position. The x- and y-axes are included in axis system 590, which is substantially similar to the axis system 490 of FIG. 4B. The intake gas is shown flowing around the shaft 220 and an intersection between the shaft 220, third passage 350, and first passage 330 interior to the second passage 340. In this way, the second passage 340 is hermetically sealed from and not in fluid communication with the first passage 330, the third passage 350, and the shaft 220.

Turning now to FIG. 6A, it shows a cross-sectional view 600 along an X-Z plane of the throttle 200 in a third position. In one example, the third position includes the third passage 350 being aligned with the central axis 292 and fluidly coupled to the downstream passage 214. Thus, the third passage 350 is not coupled to the upstream passage 212. An axis system 640 includes x- and z-axes similar to the axes systems 440 and 540 of FIGS. 4A and 5A. The third passage 350 does not fluidly couple the upstream 212 and downstream passages 214. As a result, intake gas in the upstream passage 212 does not enter the any of the first 330, second 340, and third 350 passages, as shown by arrow 612 when the throttle 200 is in the third position. However, the engine may receive air via vacuum induced airflow from the vacuum consumption device (e.g., vacuum consumption device 140 of FIG. 1), shown by arrows 614, as will be described in greater detail with respect to FIG. 6B.

Turning now to FIG. 6B, it shows a cross-sectional view 650 along an X-Y plane of the throttle in the third position. An axis system 690 includes x- and y-axes similar to the axes system 490 and 590 of FIGS. 4B and 5B, respectively. Vacuum induced airflow flows from the vacuum consumption device, through the shaft 220, into the intersection where the shaft 220, first passage 330, and third passage 350 merge within walls of the second passage 340, into the third passage 350, and to the downstream passage 214. The vacuum induced airflow is shown by arrows 614. The vacuum induced airflow may be promoted by an intake manifold vacuum being larger than a threshold vacuum, wherein the vacuum from the manifold is sufficient to draw air from the vacuum consumption device. By doing this, vacuum in a reservoir of the vacuum consumption device may increase. As such, the threshold vacuum is based on an amount of vacuum stored in the vacuum consumption device.

As shown by the number of arrows 614, a gas flow rate and/or mass flow to the engine is relatively low in the third position compared to the first and second positions. As such, the third position may correspond to a low-engine load. In one example, the low-load corresponds to a vehicle torque output being 30% or less of a maximum (e.g., 100%) vehicle torque output. In one example, the third position may also include idle or other engine conditions where a brake pedal is being depressed, which may result in the vacuum consumption device consuming an amount of vacuum stored in a vacuum reservoir. As such, the throttle 200 may synergistically be moved to the third position to supply vacuum from the intake manifold to the vacuum reservoir of the vacuum consumption device. Thus, the first position, where the gas flow rate and/or mass flow to the engine is greater than the third position and less than the second position, may correspond to a mid-load. In one example, the mid-load corresponds to a vehicle torque output being between 30 to 70% of the maximum vehicle torque output. Lastly, the second position, where the gas flow rate and/or mass flow to the engine is greater than the first and third positons, may correspond to a high-load. In one example, the high-load corresponds to a vehicle torque output being greater than 70% of the maximum torque output. Factors that may increase vehicle torque output include but are not limited to air conditioning, tip-in, drag, elevation, road grade, and the like.

In one example, for a vehicle on a road, where the vehicle comprises at least one throttle similar to the throttle 200 described above, a vehicle operator may start the vehicle, wherein the start is a cold-start. A cold-start may include where an engine temperature is less than an ambient temperature. During the cold-start, while the vehicle is cold idling, the throttle 200 may be moved to the third position where the third passage 350 is coupled to the downstream passage 214. Vacuum in the intake manifold may provide vacuum to the vacuum consumption device via the third passage 350 and the shaft 220. Thus, intake airflow to the engine is provided solely by vacuum induced airflow from the vacuum consumption device, in one example. The vehicle operator may tip-in the accelerator pedal to a first tip-in corresponding to a high engine load. The throttle is actuated to a second position where the second passage 340 is fluidly coupled to both the upstream 212 and downstream 214 passages. Vacuum is not provided to the vacuum consumption device when the throttle is in the second position. The accelerator pedal may be moved a second tip-in, where the second tip-in is more inclined than the first tip-in. In this way, the second tip-in may correspond to a mid-engine load and as a result, the throttle is actuated to the first position. The first passage 330 is fluidly coupled to the upstream 212 and downstream 214 passages and provides vacuum to the vacuum consumption device. In one example, the vacuum provided to the vacuum consumption device and an amount of vacuum induced airflow in the first position is less than the vacuum provided to the vacuum consumption device and the amount of vacuum induced airflow in the third position, respectively. The vehicle operator may desire to stop, wherein the vehicle operator releases the accelerator pedal and depresses the brake pedal. Braking may result in the vacuum consumption device consuming vacuum. The engine load may also decrease to a low-load and then idle. During the low-load and idle, the throttle may be moved to the third position. For example, during the subsequent idle once the vehicle has reached a stop and the brake pedal is depressed, the third position may provide vacuum to the vacuum consumption device as the vacuum consumption device consumes vacuum to provide the braking. In one example, the idle is a hot-idle wherein a hot-idle includes the engine temperature being greater than an ambient temperature.

The throttle described above may be operated in conjunction with a method, comprising changing intake airflow to an engine by pivoting a spherical throttle to align one of a plurality of passages arranged interior to the throttle with an intake passage of the engine. The pivoting includes actuating a hollow shaft of the throttle via an actuator, and where throttle is pivoted about an axis passing through a center of the throttle perpendicular to the intake passage. The plurality of passages comprises a first passage, a second passage, and a third passage, and where the first and second passages comprise a diameter greater than a diameter of the third passage. Each of the first, second, and third passages are offset from one another by an angle between 10-80°. Pivoting the throttle in response to an engine load less than a threshold load comprises aligning the third passage with the intake passage, and where pivoting the throttle in response to an engine load greater than the threshold load comprises aligning the second passage with the intake passage, and where pivoting the throttle in response to an engine load equal to the threshold load comprises aligning the first passage with the intake passage. One or more of the plurality of passages are fluidly coupled to a vacuum consumption device, and where the pivoting of the throttle is in response to one or more of an engine load and a vacuum in the vacuum consumption device. The method is described in greater detail below.

Turning now to FIG. 7, a method 700 for actuated the throttle to adjust a position of one or more of the passages in response to one or more conditions is shown. Instructions for carrying out method 700 may be executed by a controller based on instructions stored on a memory of the controller and in conjunction with signals received from sensors of the engine system, such as the sensors described above with reference to FIG. 1 (e.g., controller 12). The controller may employ engine actuators of the engine system to adjust engine operation, according to the methods described below.

Method 700 may be described with reference to one or more of the components described above. Specifically, the method may be described with reference to one or more of vacuum consumption device 140, engine 10, check valve 73, controller 12, throttle 200, upstream passage 212, downstream passage 214, shaft 220, first passage 330, second passage 340, and third passage 350 of FIGS. 1, 2, and 3, respectively. It will be appreciated that this list is non-limiting and as such, the method may be applied with other components not listed above.

Method 700 begins at 702, which includes determining, estimating, and/or measuring current engine operating parameters. The current engine operating parameters may include but are not limited to one or more of accelerator pedal position, throttle position, engine temperature, engine speed, vehicle speed, manifold vacuum, engine load, exhaust gas temperature, mass air flow, and air/fuel ratio.

The method 700 may proceed to 704, which includes determining if an engine load is less than a threshold load. In one example, the threshold load is a range substantially equal to a mid-load. The range may include upper and lower limits, wherein if an engine load is less than the threshold load, the engine load is outside the range and less than the lower limit. If the engine load is less than the threshold load, then the engine load may be a low-load and the method 700 may proceeds to 706.

At 706, the method 700 may include pivoting the shaft to adjust the plurality of passages located within the throttle to arrange the passages in a third position. As shown in FIGS. 6A and 6B, the third position includes the third passage being fluidly coupled to the downstream passage of the intake passage leading to the engine. Both the first and second passages are offset from and misaligned with the upstream and downstream passages when the throttle is in the third position. In one example, if the throttle is in a first position prior to 706, then the pivoting may include pivoting the passages about an axis (e.g., axis 294 of FIGS. 2 and 3) equal to the angle $\alpha_3$. Alternatively, if the throttle is in a second position prior to 706, then the pivoting may include pivoting the passage about the axis equal to a sum of the angles $\alpha_1$ and $\alpha_3$. The pivoting may be counterclockwise about the axis when rotating to the third position. The third passage receives vacuum from the downstream passage and may flow vacuum induced airflow to the downstream passage at 708. This may simultaneously replenish a vacuum stored in a vacuum reservoir of the vacuum consumption device. The method 700 may proceed to 710, where the method may include not flowing ambient air to the engine when the throttle is in the third position. As such, the only air flowing through the downstream passage to the engine is supplied from the vacuum consumption device.

In some examples, additionally or alternatively, EGR may flow to the engine when the throttle is in the third position. As an example, if an engine temperature is greater than an ambient temperature (e.g., cold-start is not occurring) and the engine load is less than the threshold load, then the throttle may be moved to the third position where the third passage provides vacuum induced airflow from the vacuum consumption device. Between the throttle and the engine, an EGR outlet may flow EGR into the downstream passage downstream of the throttle, where the EGR may merge with the vacuum induced airflow and flow to the engine. However, ambient air does not flow from the upstream passage to the downstream passage when the throttle is in the third position.

The third position may be maintained until the engine load increases, whereby the throttle may be moved to either the first position or the second position. Actuating the throttle from the third position to the first position or the second position may include pivoting the throttle in a clockwise direction. The pivoting is less than 180°. In one example, the shaft and therefore the passages are not pivoted greater than 120°.

Returning to 704, if the engine load is not less than the threshold load, then the method 700 proceeds to 712 where the method may determine if the engine load is greater than the threshold load. In one example, the engine load is a high-load if it is greater than the threshold load. If the engine load is greater than the threshold load, then the engine load is outside the range of the threshold load and greater than an upper limit of the range and the method 700 may proceed to 714, where the method may include pivoting the shaft to adjust the throttle to the second position.

As shown in FIGS. 5A and 5B, the second position includes fluidly coupling the upstream and downstream passages to the second passage arranged interior to the throttle. Ambient air may flow from the upstream passage, through the second passage, and into the downstream passage with little to no interference, at 716. In this way, the second passage may be substantially sized and shaped similar to the upstream and downstream passages. Vacuum induced airflow does not flow to the engine, at 718. This may be due to low manifold vacuum combined with the second passage being fluidly sealed from and not coupled to the shaft and/or vacuum consumption device. In this way, the second position does not replenish a vacuum reservoir of the vacuum consumption device. However, the second position does provide a greater amount of intake gas to the downstream passage, and therefore the engine, than the first and third positions.

Returning to 712, if the engine load is not greater than the threshold load, then the engine load may be substantially equal to the threshold load. In one example, if the threshold load is a range, then the engine load may be a mid-load falling between upper and lower limits of the range. The method 700 may proceeds to 720 where the method includes pivoting the shaft to adjust the throttle position to a first position. As shown above with reference to FIGS. 4A and 4B, the first position includes the first passage being fluidly coupled to the upstream and downstream passages. Thus, intake gas may flow from the upstream passage, through the first passage, and into the downstream passage. However, an amount of intake gas flowing through the first passage in the first position is less than the amount flowing through the second passage in the second position. This may be due to the flow restriction (e.g., venturi throat 402) of the first passage, wherein intake gas flow through the first passage is partially restricted. At 722, as intake gas flows through the first passage and toward the engine, suck air may mix with the intake gas and flow to the engine. Vacuum generated at the venturi throat as intake gas flow therethrough is supplied through the shaft and to the vacuum consumption device. In return, vacuum induced airflow flows through the shaft and into the first passage, where the intake gas may sweep the vacuum induced airflow to the engine. As such, the first position includes flowing intake gas and vacuum induced airflow to the engine, while replenishing a vacuum of the vacuum consumption device.

In this way, a spherical throttle may be arranged between upstream and downstream passages of an intake passage of an engine. The throttle may be configured to adjust one or more of the intake gas flow directed to the engine and vacuum provided to a vacuum consumption device. The technical effect of utilizing a throttle to adjust intake gas flow and vacuum flow is to decrease packaging constraints and increase fuel economy.

A first embodiment of a method comprises changing intake airflow to an engine by pivoting a spherical throttle to align one of a plurality of passages arranged interior to the throttle with an intake passage of the engine. A first example of the method further includes where pivoting includes actuating a hollow shaft of the throttle via an actuator, and where throttle is pivoted about an axis passing through a center of the throttle perpendicular to the intake passage. A second example of the method, optionally including the first example, further includes where the plurality of passages comprises a first passage, a second passage, and a third passage, and where the first and second passages comprise a diameter greater than a diameter of the third passage. A third example of the method, optionally including the first and/or second examples further includes where each of the first, second, and third passages are offset from one another by an angle between 10-80°. A fourth example of the method, optionally including one or more of the first through third examples further includes where pivoting the throttle in response to an engine load less than a threshold load comprises aligning the third passage with the intake passage, and where pivoting the throttle in response to an engine load greater than the threshold load comprises aligning the second passage with the intake passage, and where pivoting the throttle in response to an engine load equal to the threshold load comprises aligning the first passage with the intake passage. A fifth example of the method, optionally including one or more of the first through fourth examples further includes where one or more of the plurality of passages are fluidly coupled to a vacuum consumption device.

An embodiment of a system comprises a throttle arranged along an intake passage of an engine having first, second, and third passages located interior to an outer shield of the throttle, where the throttle pivots about an axis of a hollow shaft to adjust a coupling of the intake passage to each of the first, second, and third passages. A first example of the system further includes where the hollow shaft is fluidly coupled to a vacuum consumption device, and where the hollow shaft sucks air from the vacuum consumption device in one or more positions of the throttle. A second example of the system, optionally including the first example, further includes where the throttle is pivoted to a first position where only the first passage is fluidly coupled to upstream and downstream portions of the intake passage relative to a direction of intake airflow to the engine in response to an engine load being equal to a threshold load, and where the throttle is pivoted to a second position where only the second passage is fluidly coupled to upstream and downstream portions of the intake passage in response to an engine load being greater than the threshold load, and where the throttle is pivoted to a third position wherein the third passage is fluidly coupled to only the downstream portion of the intake passage in response to an engine load being less than the threshold load. A third example of the system, optionally including the first and/or second examples, further includes where the hollow shaft and the third passage are fluidly coupled and intersect with each other at a greatest constriction of the first passage, interior to the second passage. A fourth example of the system, optionally including one or more of the first through third examples further includes where the first passage is a venturi passage and the second and third passages are tubular. A fifth example of the system, optionally including one or more of the first through fourth examples further includes where the second passage comprises a diameter and a length greater than a diameter and a length of the third passage, respectively. A sixth example of the system, optionally including one or more of the first through fifth examples further includes where the hollow shaft pivots the first, second, and third passages between 20-160° about its axis, where the axis is perpendicular to a general direction of intake airflow.

A second embodiment of a system comprising an engine comprising an intake passage, a spherical throttle arranged along the intake passage, the spherical throttle comprising an immovable outer shield with cut-outs corresponding to upstream and downstream portions of the intake passage, and an inner surface, interior to the outer shield, being coupled to first, second, and third passages arranged interior to the inner surface, where the passages are differently sized. A first example of the system further includes where the first passage comprises a venturi throat, and where the first passage is fluidly coupled to the third passage and a hollow shaft at the venturi throat. A second example of system, optionally including the first example, further includes where the first, second, and third passages are physically coupled to the hollow shaft and where the hollow shaft extends through the inner surface and the outer shield of the throttle to an actuator, where the actuator is operated to actuate the hollow shaft to pivot the first, second, and third passages. A third example of the system, optionally including the first and/or second examples, further includes where the throttle comprises no other inlets or outlets other than the cut-outs and a hollow shaft. A fourth example of the system, optionally including one or more of the first through third examples further includes where a first angle located between the first passage and one or more of the second passage and the third passage, and where the first angle is smaller than a second angle located between the second and third passages. A fifth example of the system, optionally including one or more of the first through fourth examples further includes where the first, second, and third passages are pivoted based on an actuation of a shaft coupled to each of the first, second, and third passages, and where the passages pivot in increments of the first angle about an axis of the shaft. A sixth example of the method, optionally including one or more of the first through fifth examples further includes where the first passage and the second passage comprise lengths equal to a diameter of the inner surface, and where the third passage comprises a length equal to a radius of the inner surface.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
    an engine comprising an intake passage;
    a spherical throttle arranged along the intake passage, the spherical throttle comprising an immovable outer shield with cut-outs corresponding to upstream and downstream portions of the intake passage; and
    an inner surface, interior to the outer shield, being coupled to first, second, and third passages arranged interior to the inner surface, where the passages are differently sized.

2. The system of claim 1, wherein the first passage comprises a venturi throat, and where the first passage is fluidly coupled to the third passage and a hollow shaft at the venturi throat.

3. The system of claim 2, wherein the first, second, and third passages are physically coupled to the hollow shaft and where the hollow shaft extends through the inner surface and the outer shield of the throttle to an actuator, where the actuator is operated to actuate the hollow shaft to pivot the first, second, and third passages.

4. The system of claim 2, wherein the throttle comprises no other inlets or outlets other than the cut-outs and a hollow shaft.

5. The system of claim 1, further comprising a first angle located between the first passage and one or more of the second passage and the third passage, and where the first angle is smaller than a second angle located between the second and third passages.

6. The system of claim 5, wherein the first, second, and third passages are pivoted based on an actuation of a shaft coupled to each of the first, second, and third passages, and where the passages pivot in increments of the first angle about an axis of the shaft.

7. The system of claim 1, wherein the first passage and the second passage comprise lengths equal to a diameter of the inner surface, and where the third passage comprises a length equal to a radius of the inner surface.

8. A system comprising:
    a throttle arranged along an intake passage of an engine having first, second, and third passages located interior to an outer shield of the throttle, where the throttle pivots about an axis of a hollow shaft to adjust a coupling of the intake passage to each of the first, second, and third passages.

9. The system of claim 8, wherein the hollow shaft is fluidly coupled to a vacuum consumption device, and where the hollow shaft sucks air from the vacuum consumption device in one or more positions of the throttle.

10. The system of claim 8, wherein the throttle is pivoted to a first position where only the first passage is fluidly coupled to upstream and downstream portions of the intake passage relative to a direction of intake airflow to the engine in response to an engine load being equal to a threshold load, and where the throttle is pivoted to a second position where only the second passage is fluidly coupled to upstream and downstream portions of the intake passage in response to an engine load being greater than the threshold load, and where the throttle is pivoted to a third position wherein the third passage is fluidly coupled to only the downstream portion of the intake passage in response to an engine load being less than the threshold load.

11. The system of claim 8, wherein the hollow shaft and the third passage are fluidly coupled and intersect with each other at a greatest constriction of the first passage, interior to the second passage.

12. The system of claim 8, wherein the first passage is a venturi passage and the second and third passages are tubular.

13. The system of claim 12, wherein the second passage comprises a diameter and a length greater than a diameter and a length of the third passage, respectively.

14. The system of claim 8, wherein the hollow shaft pivots the first, second, and third passages between 20-160° about its axis, where the axis is perpendicular to a general direction of intake airflow.

15. A method, comprising:
    changing intake airflow to an engine by pivoting a spherical throttle to align one of a plurality of passages arranged interior to the throttle with an intake passage of the engine.

16. The method of claim 15, wherein the pivoting includes actuating a hollow shaft of the throttle via an actuator, and where throttle is pivoted about an axis passing through a center of the throttle perpendicular to the intake passage.

17. The method of claim 15, wherein the plurality of passages comprises a first passage, a second passage, and a third passage, and where the first and second passages comprise a diameter greater than a diameter of the third passage.

18. The method of claim 17, wherein each of the first, second, and third passages are offset from one another by an angle between 10-80°.

19. The method of claim 17, wherein pivoting the throttle in response to an engine load less than a threshold load comprises aligning the third passage with the intake passage, and where pivoting the throttle in response to an engine load greater than the threshold load comprises aligning the second passage with the intake passage, and where pivoting the throttle in response to an engine load equal to the threshold load comprises aligning the first passage with the intake passage.

20. The method of claim 15, wherein one or more of the plurality of passages are fluidly coupled to a vacuum consumption device.

* * * * *